Sept. 10, 1940. W. AUER 2,214,190
TURBOTRANSMISSION CONTROL MEANS
Filed May 20, 1938 2 Sheets-Sheet 1

Patented Sept. 10, 1940

2,214,190

UNITED STATES PATENT OFFICE 2,214,190

TURBOTRANSMISSION CONTROL MEANS

Wilhelm Auer, Heidenheim-on-the-Brenz, Germany, assignor to J. M. Voith, Heidenheim-on-the-Brenz, Germany, a copartnership composed of Walther Voith, Hermann Voith, and Hanns Voith Application May 20, 1938, Serial No. 209,120
In Germany May 28, 1937

11 Claims. (Cl. 60—54)

This invention relates to hydraulic transmissions, and in particular to control apparatus for such transmissions.

One object of this invention is to provide a control arrangement for a turbo transmission especially for vehicles, whereby the individual units of the turbo transmission may be individually placed in and out of operation by filling or emptying the respective units, the entire operation of filling and emptying the units being controlled by a common distributing valve for the entire turbo transmission.

Another object is to provide such a control arrangement, whereby the circuit is provided with means for filling and emptying the individual units, cooling the fluid and rapidly emptying the units, this procedure being controlled by a common distributing valve for the entire turbo transmission.

Another object is to provide a control arrangement, as described above, wherein the distributing valve is arranged in one position to cause the working fluid of the circuit to circulate through a cooler for cooling therein while the vehicle is at a standstill with its engine running.

Another object is to provide a control arrangement, as described above, wherein a hydraulic coupling and a torque converter are associated in the transmission, and the distributing valve is arranged in one position to provide a continual fluid flow from the torque converter to a cooler in order to cool the working fluid while the torque converter is being employed in driving the vehicle.

Another object is to provide a control arrangement, as described above, wherein while the hydraulic coupling is being employed in driving the vehicle, means is provided for rapidly emptying the torque converter by way of the distributing valve through relatively large conduits, whereas while the torque converter is being employed in driving the vehicle the distributing valve is positioned to permit only a small amount of fluid to escape from the torque converter through relatively small conduits.

Another object is to provide a control arrangement, as described above, wherein while the hydraulic coupling is being filled, means is provided for conducting a part of the working fluid immediately into the cooler from the pump, and thence back into the fluid container.

Figure 1:
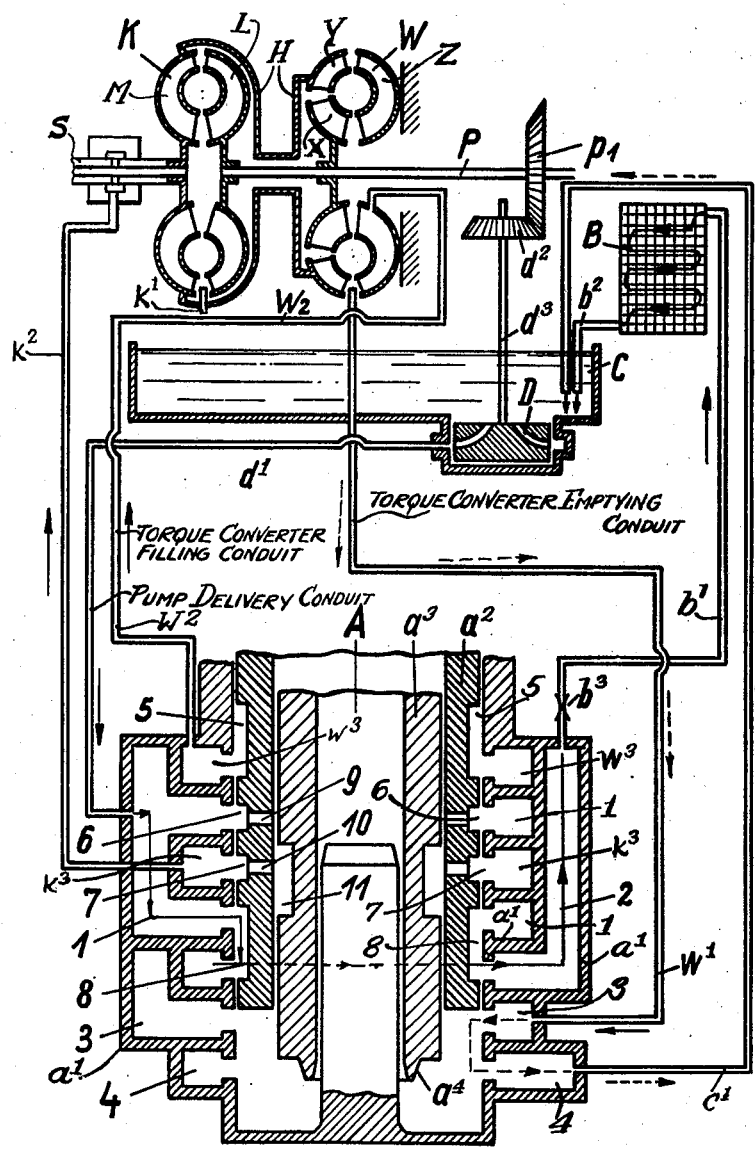
Figure 1 is a diagrammatic view, mainly in section and showing a hydraulic transmission control circuit according to one embodiment of the present invention, wherein the control valve is positioned to empty both units of the hydraulic transmission.

In general, the invention consists of a hydraulic transmission having a plurality of units therein, such as a hydraulic coupling and a torque converter. A hydraulic filling, emptying and cooling circuit is connected to these units by way of a control valve, in such a manner that the control valve may be shifted into several positions to regulate the filling and emptying of the respective units. In one position of the control valve both units of the hydraulic transmission are arranged to be emptied so that the vehicle remains at a standstill with its engine running, yet a portion of the working fluid is circulated through a cooler.

In another position of the control valve the torque converter is filled while the hydraulic coupling is emptied, and at the same time a small but continual fluid flow takes place from the torque converter by way of the distributing valve, through relatively small conduits to the cooler, and back through the circulating pump to the torque converter, thereby cooling the working fluid during the operation of the torque converter. In still another position of the control valve the torque converter is rapidly emptied of its fluid by way of the control valve, through relatively large conduits while the hydraulic coupling is filled.

During the filling of the hydraulic coupling, moreover, the control valve is arranged to conduct a portion of the working fluid directly to the cooler, and thence back into the fluid container through the operation of the circulating pump. In this manner a single control valve controls the filling and emptying of the individual units of the fluid transmission in a simple yet rapid manner. Such a rapid emptying of the units is necessary for efficient operation in the starting and stopping of the vehicle, or in shifting from one unit to the other when the driving conditions change.

Hitherto, torque converters have been provided with an outlet opening which emptied directly into the fluid container. With this arrangement the opening has to be sufficiently large that only so much oil can flow out of the converter into the fluid container as is necessary for the carrying away of the heat arising during the operation of the transmission. The size of this outlet opening of the torque converter may be increased only to a limited extent since with an increase in the size of the opening to which the fluid is discharged from the torque converter, a corresponding loss of energy and a consequent decrease in the efficiency result. Nevertheless, in shifting from one unit to another it is essential that the torque converter shall be emptied as rapidly as possible in order that it shall not interfere with the action of the unit being brought into operation by filling. This emptying, however, hitherto took place very slowly throughout the opening, due to its limited size on account of the above-mentioned necessity of preventing too great a loss of working fluid during normal operation.

In such prior transmissions, therefore, it frequently occurred that after the hydraulic coupling had been filled and the torque converter had been intended to be emptied, nevertheless, the torque converter still remained partially filled when the hydraulic coupling was placed in operation. This partial filling of the torque converter opposed and interfered with the operation of the hydraulic coupling and resulted in an excessively great absorption of work. Under these conditions, the driving engine was necessarily required to furnish an abnormal amount of power. Many driving engines, however, were incapable of delivering such an excessive amount of power without a corresponding reduction in speed. Consequently, during such a condition the speed of the vehicle, in changing from one unit to another, was greatly reduced. Accordingly, prior transmissions were faced with the conflicting requirements of maintaining the outlet opening of the torque converter at a very small size during normal operation, but making them of very large size during the emptying operation. In such prior transmissions were faced with the conflicting requirements. A ranged so that the fluid with the highest temperature was immediately cooled. Another requirement, therefore, is that the working fluid flowing out of the torque converter which possesses the highest temperature is conducted immediately into the cooler.

Referring to the drawings in detail, Figure 1 shows a hydraulic transmission control circuit arranged to permit idling of the driving engine while the vehicle is at a standstill. In Figure 1 the transmission is shown to contain a hydraulic coupling K and a hydraulic torque converter W, driven by a primary shaft P from a motor (not shown). The output of the transmission is delivered over the secondary shaft S. The hydraulic coupling K contains two blade assemblies consisting of primary and secondary rotors L and M, mounted on the primary and secondary shafts P and S, respectively. The torque converter W contains three or more blade assemblies, the three assemblies illustrated consisting of a primary rotor X mounted on the primary shaft P, a secondary rotor Y and a stationary guide wheel Z. The secondary rotor Y is connected by the housing H to the secondary rotor M, and through the latter to the secondary shaft S. Mounted upon the primary shaft P is a bevel gear $p'$ which meshes with a bevel gear $d^2$ upon a shaft $d^3$, which drives the fluid circulating pump D. The latter is arranged for circulating the working fluid from the fluid container or tank C, through the filling and emptying circuit.

From the circulating pump D the conduit $d'$ delivers fluid by way of the control valve, generally designated A, to the hydraulic coupling K and the torque converter W, or to the cooler B, respectively. The hydraulic coupling K is emptied by means of the conduit $k'$ leading from its periphery directly into the fluid container or tank C. The torque converter W, however, is emptied by means of the conduit $w'$ leading to the control valve A. According to one position of the control valve A the working fluid coming from the torque converter W, through the conduit $w'$, can be conducted through the conduit $b'$ to the cooler B, and thence through the cooler discharge conduit $b^2$, into the fluid container C for slow circulation and cooling of the working fluid during the normal operation of the torque converter W. With a different setting of the control valve A, however, the rapid emptying of the torque converter W may be obtained by conducting the fluid through the conduit $w'$ and the control valve A, through the conduit $c'$ leading directly into the fluid container C. For filling the hydraulic coupling K and the torque converter W the conduits $k^2$ and $w^2$ lead thereto, respectively, from the control valve A.

The control valve A consists of the stationary housing $a'$, the main valve member $a^2$ and the auxiliary valve member $a^3$ having at the end thereof a foot portion $a^4$. The stationary housing $a'$ is divided into chambers, respectively designated 1, 2, 3, 4, $w^3$ and $k^3$. The pump D discharges its contents through the conduit $d'$ into the chamber 1 of the control valve A, from the chamber 2 of which the conduit $b'$ leads to the cooler B. The discharge conduit $w'$ of the torque converter W empties into the chamber 3 of the control valve A, whereas from the chamber 4 thereof the discharge conduit $c'$ leads directly to the fluid container C, while from the chamber $w^3$ the torque converter filling pipe $w^2$ leads to the torque converter W, whereas from the chamber $k^3$ the hydraulic coupling filling pipe $k^2$ leads to the hydraulic coupling K. The main valve member $a^2$ is provided with annular nitches or cutaway portions 5, 6, 7 and 8, together with control ports 9 and 10 therethrough. The auxiliary valve member $a^3$ is provided with an annular nitch or cutaway portion 11. The above-mentioned nitches or cutaway portions constitute annular grooves in the respective valve members.

Figure 2:
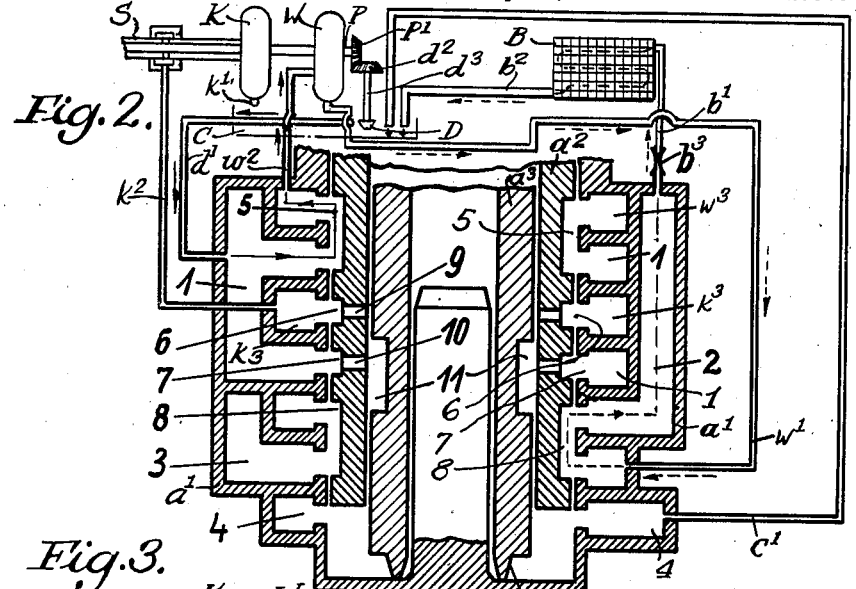
Figure 2 is a sectional view of a part of Figure 1, but with the control valve shifted to place the torque converter in operation by filling it and to empty the hydraulic coupling.
Figure 3:
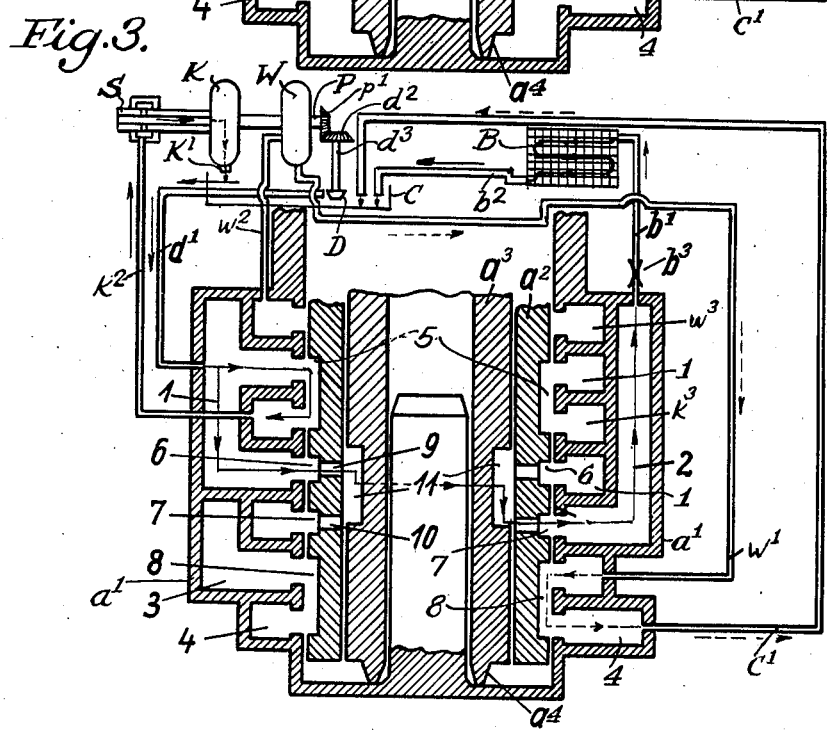
Figure 3 is a sectional view similar to Figure 2, but with the slide valve in a position wherein the hydraulic coupling is placed in operation by filling it and the torque converter is emptied.

In Figures 1, 2 and 3, the flow from the pump D is indicated by full line arrows, whereas the drainage flow from the torque converter W is indicated by dotted arrows.

In the operation of the circuit with the control valve A positioned as in Figure 1, the motor (not shown) drives the primary shaft P and consequently also drives the circulating pump D. In this position of the control valve A, however, the hydraulic coupling K and the torque converter W are emptied, hence, the absence of working fluid therein causes the vehicle to remain at a standstill with the engine running. The secondary or output shaft S, therefore, does not rotate. The working fluid taken up by the pump D from the fluid container or tank C is conducted through the conduit $d'$ to the chamber 1 of the main valve A, whence it passes through the nitch or groove 8 in the main valve member $a^2$ to the chamber 2, and from there it proceeds by way of the adjustable choke $b^3$, through the conduit $b'$, the cooler B and the cooler discharge conduit $b^2$, into the fluid container C. The main valve member $a^2$, in the position shown in Figure 1, cuts off communication between the pump conduit $d'$ and the filling conduits $k^2$ and $w^2$, leading to the hydraulic coupling K and the torque converter W, respectively.

Accordingly, in this "standstill" position of the control valve A the working fluid is prevented from passing into either the hydraulic coupling K or the torque converter W, and the working fluid is continually circulated by the pump D from the container C, through the main valve A and the cooler B, back into the container C. The circuit is therefore provided with a ready supply of cooled fluid at the instant starting up of the vehicle becomes necessary.

In the operation of the circuit with the control valve A in the position of Figure 2, the circuit is arranged for driving the vehicle by means of the torque converter W. For this purpose the main valve member $a^2$ has been moved downwardly one stage from its position in Figure 1, and the auxiliary valve member $a^3$ has likewise been shifted to its lowest position. The working fluid pumped by the pump D through the pump conduit $d'$ discharges, as before, into the chamber 1 of the main valve A, whence it proceeds through the groove 5 of the main valve member $a^2$, into the chamber $w^3$ whence it proceeds by way of the torque converter filling conduit $w^2$ to the torque converter W. By this arrangement the torque converter is filled with working fluid so that it transmits a torque from the primary shaft P to the secondary shaft S, and thence to the driving axles so that the vehicle is placed in motion.

Meanwhile, the working fluid flows through the torque converter W, where it is heated up by the action of the torque converter. In order to cool this heated fluid a portion of the fluid escapes slowly from the torque converter W, through the conduit $w'$, into the chamber 3 of the control valve A, whence it passes through the groove 8, into the chamber 2, and thence through the choke $b^3$, conduit $b'$, cooler B and cooler discharge conduit $b^2$, into the fluid container or tank C. In this manner the working fluid employed in the normal operation of the torque converter W is constantly circulated through the cooler and its temperature reduced.

In the operation of the circuit with the control valve A in the position shown in Figure 3, the circuit is arranged for driving the vehicle by means of the hydraulic coupling K, the torque converter W being emptied in this arrangement. For accomplishing this the main valve member $a^2$ is shifted downwardly two stages below its position in Figure 1, and one stage below its position in Figure 2. The auxiliary valve member $a^3$, however, remains in the same position as in Figure 2. With this arrangement, the working fluid is pumped by the pump D, through the pump conduit $d'$, into the chamber 1, as before. From the chamber 1 this fluid passes through the groove 5 in the main valve member $a^3$, into the chamber $k^3$, whence it proceeds through the hydraulic coupling filling conduit $k^2$ to the hydraulic coupling K. In this manner the hydraulic coupling K is filled with working fluid and takes over the drive of the vehicle by transmitting the torque from the primary shaft P to the secondary shaft S.

Meanwhile, a part of the working fluid furnished by the pump D passes from the valve chamber 1, by way of the grooves 6 and 7, the ports 9 and 10 and the groove 11 of the auxiliary valve member $a^3$, into the chamber 2, whence it passes through the choke $b^3$, the conduit $b'$, the cooler B and the conduit $b^2$, into the fluid container C. At the same time the discharge conduit $w'$ of the torque converter W discharges fluid into the chamber 3, through the groove 8 in the main valve member $a^2$, into the chamber 4, and thence through the conduit $c'$, directly back to the fluid container C. The conduit $c'$ is of relatively large diameter as compared with the conduit $b'$, as limited by the choke $b^3$, hence, a rapid emptying of the torque converter W takes place in this arrangement of the circuit.

The choke $b^3$ serves as a throttle valve by which the discharge of fluid from the torque converter W can be regulated during the normal operation thereof so as to prevent the undue loss of energy by the discharge of an excessive amount of fluid from the converter circuit. At the same time the adjustment of the choke $b^3$ gives a control over the cooling action of the circuit and regulates the rate at which the working fluid will be cooled. As previously stated, the cross sections of the conduits $w'$ and $c'$ are relatively large in comparison with the cross section of the choke $b^3$ in the cooling conduit $b'$ so as to enable a rapid emptying of the torque converter W.

It will be understood that I desire to comprehend within my invention such modifications as come within the scope of the claims and the invention.

Having thus fully described my invention, what I claim as new and desire to secure by Letters Patent, is:

1. In a hydraulic transmission circuit, a plurality of hydraulic power transmitters, means for selectively discharging fluid from one of said transmitters at relatively rapid and relatively slow rates, respectively, valve means for controlling the selection of said rates, and means for cooling the fluid discharged from said transmitter only at one of said rates.

2. In a hydraulic transmission circuit, a plurality of hydraulic power transmitters, means for selectively discharging fluid from one of said transmitters at relatively rapid and relatively slow rates, respectively, valve means for controlling the selection of said rates, and means for cooling the fluid discharged from said transmitter only at the relatively slow rate.

3. In a hydraulic transmission circuit, a hydraulic coupling, a hydraulic torque converter, a source of fluid supply, a fluid distributing valve for selectively controlling the filling and emptying of said coupling and said torque converter, a cooler, and hydraulic connections between said source, said valve, said coupling, said converter, and said cooler, said valve being arrangeable in one position to direct fluid from said source through said connections and said cooler back to said source as well as to cut off the supply of fluid to said coupling and to said converter.

4. In a hydraulic transmission circuit, a hydraulic coupling, a hydraulic torque converter, a source of fluid supply, a fluid distributing valve, a cooler, and hydraulic connections between said source, said valve, said coupling, said converter and said cooler, said valve being arrangeable in one position to direct fluid from said source to said coupling as well as to cut off the supply of fluid to said converter and to direct a portion of the fluid through said cooler to said source.

5. In a hydraulic transmission circuit, a hydraulic coupling, a hydraulic torque converter, a source of fluid supply, a fluid distributing valve, a cooler, and hydraulic connections between said source, said valve, said coupling, said converter and said cooler, said valve being arrangeable in one position to direct fluid from said source to said coupling as well as to cut off the supply of fluid to said converter, and to withdraw a portion of the fluid from delivery to said coupling for delivery to said cooler and thence to said source.

6. In a hydraulic transmission circuit, a hydraulic coupling, a hydraulic torque converter, a source of fluid supply, a fluid distributing valve, a cooler, and hydraulic connections between said source, said valve, said coupling, said converter and said cooler, said valve being arrangeable in one position to direct fluid from said source through said connections and said cooler back to said source as well as to cut off the supply of fluid to said coupling and to said converter and also to direct fluid directly from said converter to said source, said valve being arrangeable in a second position to direct fluid from said source to said converter and also to direct fluid from said converter through said cooler to said source as well as to cut off the supply of fluid to said coupling.

7. In a hydraulic transmission circuit, a hydraulic coupling, a hydraulic torque converter, a source of fluid supply, a fluid distributing valve, a cooler, and hydraulic connections between said source, said valve, said coupling, said converter and said cooler, said valve being arrangeable in one position to direct fluid from said source through said connections and said cooler back to said source as well as to cut off the supply of fluid to said coupling and to said converter and also to direct fluid from said converter to said source by-passing said cooler, said valve being arrangeable in a second position to direct fluid from said source to said converter and also to direct fluid from said converter through said cooler to said source as well as to cut off the supply of fluid to said coupling, said valve being arrangeable in a third position to direct fluid from said source to said coupling as well as to cut off the supply of fluid to said converter.

8. In a hydraulic transmission circuit, a hydraulic coupling, a hydraulic torque converter, a source of fluid supply, a fluid distributing valve, a cooler, and hydraulic connections between said source, said valve, said coupling, said converter and said cooler, said valve being arrangeable in one position to direct fluid from said source through said connections and said cooler back to said source as well as to cut off the supply of fluid to said coupling and to said converter, said valve being arrangeable in a second position to direct fluid from said source to said converter and also to direct fluid from said converter through said cooler to said source as well as to cut off the supply of fluid to said coupling, said valve being arrangeable in a third position to direct fluid from said source to said coupling as well as to cut off the supply of fluid to said converter, and also to direct a portion of the fluid through said cooler to said source.

9. In a hydraulic transmission circuit, a hydraulic coupling, a hydraulic torque converter, a source of fluid supply, a fluid distributing valve, a cooler, and hydraulic connections between said source, said valve, said coupling, said converter and said cooler, said valve being arrangeable in one position to direct fluid from said source through said connections and said cooler back to said source as well as to cut off the supply of fluid to said coupling and to said converter, said valve being arrangeable in a second position to direct fluid from said source to said converter and also to direct fluid from said converter through said cooler to said source as well as to cut off the supply of fluid to said coupling, said valve being arrangeable in a third position to direct fluid from said source to said coupling as well as to cut off the supply of fluid to said converter, and also to withdraw a portion of the fluid from delivery to said coupling for delivery to said cooler and thence to said source.

10. In a hydraulic transmission circuit, a hydraulic coupling, a hydraulic torque converter, a source of fluid supply, a fluid-distributing valve, a cooler, a fluid-flow restrictor and hydraulic connections between said source, said valve, said coupling, said cooler and said flow restrictor, said valve being arrangeable in one position to direct fluid from said source to said converter and also to direct fluid from said converter through said flow restrictor and said cooler to said source, as well as to cut off the supply of fluid to said coupling, said valve being arrangeable in another position to direct fluid from said source to said coupling and also to direct fluid from said source through said cooler back to said source and also to by-pass fluid from said converter around said flow restrictor and said cooler to said source, as well as to cut off the supply of fluid to said converter.

11. In a hydraulic transmission circuit, a hydraulic coupling, a hydraulic torque converter, a source of fluid supply, a fluid distributing valve, a cooler, a fluid flow restrictor and hydraulic connections between said source, said valve, said coupling, said cooler and said flow restrictor, said valve being arrangeable in one position to direct fluid from said source through said connections and said cooler back to said source as well as to cut off the supply of fluid to said coupling and to said converter, said valve being arrangeable in a second position to direct fluid from said source to said converter and also to direct fluid from said converter through said flow restrictor and said cooler to said source, as well as to cut off the supply of fluid to said coupling, the said valve being arrangeable in another position to direct fluid from said source to said coupling and also to direct fluid from said source through said cooler back to said source and also to by-pass fluid from said converter around said flow restrictor and said cooler to said source, as well as to cut off the supply of fluid to said converter.

WILHELM AUER.